US009544292B2

(12) United States Patent
Irving, Jr. et al.

(10) Patent No.: US 9,544,292 B2
(45) Date of Patent: *Jan. 10, 2017

(54) CREDENTIAL MANAGEMENT

(71) Applicant: Amazon Technologies, Inc., Reno, NV (US)

(72) Inventors: James Leon Irving, Jr., Herndon, VA (US); Andrew Paul Mikulski, Fairfax, VA (US); Gregory Branchek Roth, Seattle, WA (US); William Frederick Kruse, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/963,760

(22) Filed: Dec. 9, 2015

(65) Prior Publication Data

US 2016/0087964 A1    Mar. 24, 2016

Related U.S. Application Data

(63) Continuation of application No. 14/040,373, filed on Sep. 27, 2013, now Pat. No. 9,319,392.

(51) Int. Cl.
*H04L 29/00* (2006.01)
*H04L 29/06* (2006.01)

(52) U.S. Cl.
CPC ............ *H04L 63/08* (2013.01); *H04L 63/102* (2013.01); *H04L 63/10* (2013.01); *H04L 63/12* (2013.01)

(58) Field of Classification Search
CPC .......... H04L 63/08; H04L 63/10; H04L 63/14; H04L 63/12; H04L 63/102; H04L 29/06823; H04L 67/02; H04L 67/306; H04L 29/06836; H04L 29/0685; H04L 29/06857
See application file for complete search history.

(56) References Cited

U.S. PATENT DOCUMENTS 8,528,057 B1   9/2013  Garrett
2006/0206929 A1   9/2006  Taniguchi et al.
(Continued)

OTHER PUBLICATIONS

"Non Final Office Action dated Dec. 31, 2014" received in U.S. Appl. No. 14/040,373.
(Continued)

*Primary Examiner* — Don Zhao
(74) *Attorney, Agent, or Firm* — Hogan Lovells US LLP

(57) ABSTRACT

A credential management system is described that provides a way to disable and/or rotate credentials, such as when a credential is suspected to have been compromised, while minimizing potential impact to various systems that may depend on such credentials. The credentials may be disabled temporarily at first and the availability of various resources is monitored for changes. If no significant drop of availability in the resources has occurred, the credential may be disabled for a longer period of time. In this manner, the credentials may be disabled and re-enabled for increasingly longer time intervals until it is determined with sufficient confidence/certainty that disabling the credential will not adversely impact critical systems, at which point the credential can be rotated and/or permanently disabled. This process also enables the system to determine which systems are affected by a credential in cases where such information is not known.

20 Claims, 7 Drawing Sheets

(56) References Cited

U.S. PATENT DOCUMENTS

| | | |
|---|---|---|
| 2010/0050249 A1 | 2/2010 | Newman |
| 2013/0014236 A1 | 1/2013 | Bingell et al. |
| 2013/0138968 A1 | 5/2013 | Yudkin et al. |
| 2013/0298208 A1 | 11/2013 | Ayed |
| 2014/0059671 A1 | 2/2014 | Celi et al. |
| 2014/0173707 A1* | 6/2014 | Hollander ............... H04L 63/10 726/7 |
| 2014/0282940 A1 | 9/2014 | Williams et al. |

OTHER PUBLICATIONS

"Notice of Allowance dated Jul. 1, 2013" received in U.S. Appl. No. 14/040,373.

* cited by examiner

CREDENTIAL MANAGEMENT

CROSS-REFERENCE TO RELATED APPLICATIONS

This application is a continuation of U.S. patent application Ser. No. 14/040,373; entitled "CREDENTIAL MANAGEMENT" filed Sep. 27, 2013 which is incorporated herein by reference for all purposes. As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources (e.g., virtual machines, block data storage, etc.) through the cloud, and thus does not have to purchase and maintain the hardware and/or software needed.

BACKGROUND

Security is an important concern in cloud computing due to the nature of the multitenant environment where multiple users share the resources. It is generally important for the cloud operator or service provider to manage the usernames, passwords, cryptographic keys, public key infrastructure (PKI) certificates and the like. This can be a cumbersome task because of the large numbers of users and credentials involved. In certain situations, credentials may be leaked, stolen or otherwise compromised. It is desirable to provide an efficient way to manage such large numbers of credentials, including rotating them at certain times.

BRIEF DESCRIPTION OF THE DRAWINGS

Various embodiments in accordance with the present disclosure will be described with reference to the drawings, in which.

DETAILED DESCRIPTION

Figure 1:
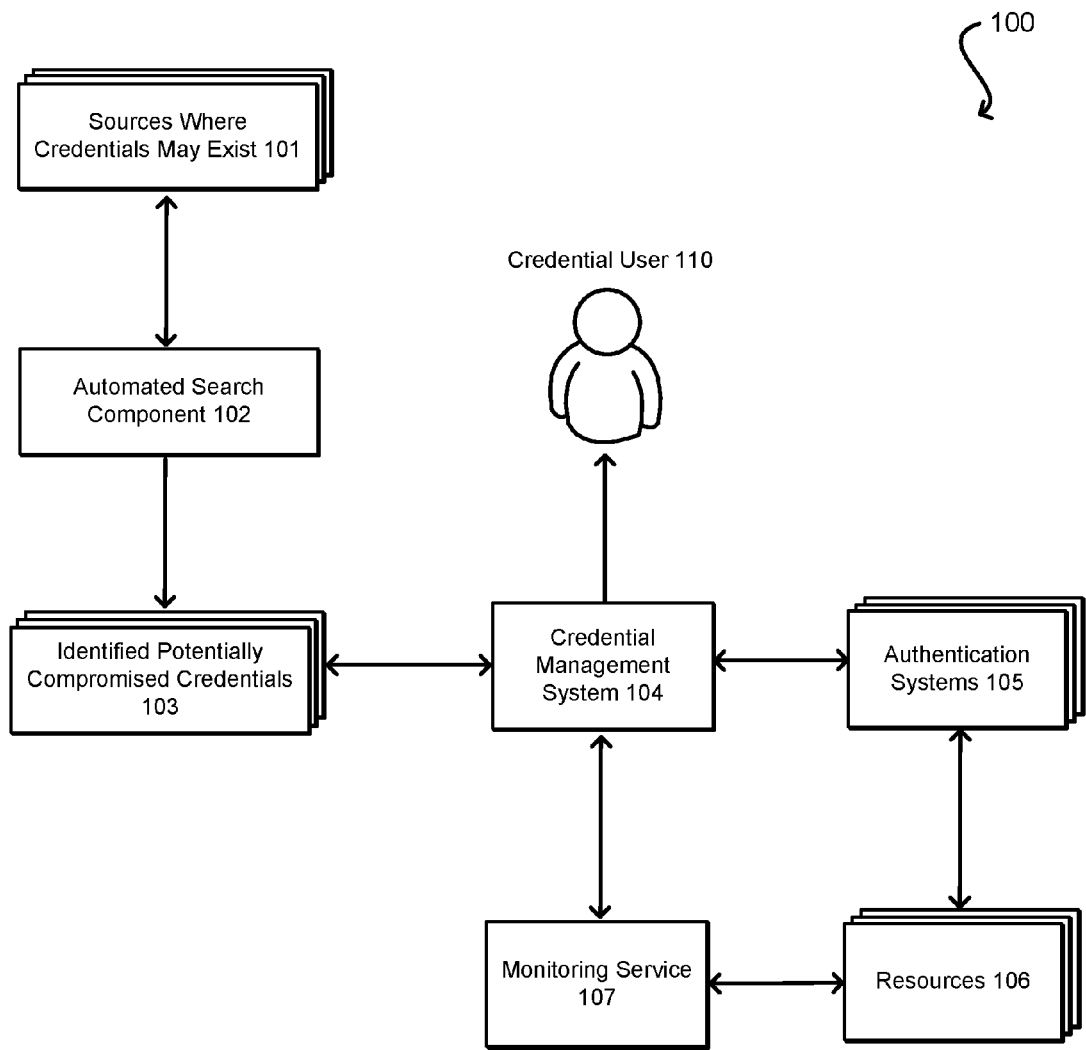
FIG. 1 illustrates an example of a credential management system, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for managing security credentials for computing resources. In particular, a credential management system is described that provides a way to disable and/or rotate credentials, such as when a credential is suspected to have been compromised, while minimizing potential impact to various systems that may depend on such credentials. The credentials, or use of the credentials, may be temporarily disabled at first, and the availability of various resources monitored for changes. A credential can be disabled in a number of different ways, such as by changing an effective date of the credential to a date in the future and/or past, or by causing the credential to be invalid for a determined period of time and/or until availability of one or more associated resources drops below a minimum threshold value, etc. The credential can then be re-enabled after a period of time, in response to no change in availability of one or more associated resources, or upon some other event, trigger, or occurrence. If no significant drop of availability in the resources occurs, the credential may be disabled for a longer period of time. In this manner, the credentials may be disabled and re-enabled for increasingly longer time intervals until it is determined with sufficient confidence/certainty that disabling the credential will not adversely impact critical systems, at which point the credential can be rotated and/or permanently disabled. This process also enables the system to determine which systems are affected by a credential in cases where such information is not known.

In various embodiments, the system can identify a set of credentials (e.g., potentially compromised credentials) that may need to be rotated and/or disabled. Each credential can be used to authenticate an owner, or user, of the credential against one or more authentication systems to grant access to computing resources. The potentially compromised credentials can be identified by performing automated searches against common sources of credential exposures (e.g., wiki pages, Internet, etc.).

Once the system has identified the credentials, it may generate notifications for the owners of the credentials, instructing them to rotate the credential. If the owners have not rotated the credential by some threshold time limit, the system can begin disabling the credential temporarily. In one embodiment, the system monitors the availability of computing resources that have been identified to be accessible by using the credential, while the credential is disabled. The credential is first disabled for small time interval (e.g., several seconds) and then re-enabled. The system can then determine a change in the availability of the one or more computing resources during the time interval during which the credential was disabled. If the availability of the resources has remained at least above a minimum threshold during the first time interval, the system may disable the credential for a longer time interval and then check the changes again. This process can continue until it is stopped by an administrator or until the time interval for disabling the credential reaches a sufficiently long time interval (e.g., longer than a defined threshold) during which the availability of the resources remains sufficiently high. At this point, the credential may be rotated or permanently disabled.

In various embodiments, the credential management system can be implemented in a multitenant and/or virtualized shared resource environment, often referred to as a cloud computing environment. Conventionally, in this type of environment, host computing devices utilize virtualization technology to provision one or more virtual machine instances that are associated with different customers of a service provider or other operator of the environment (e.g., cloud computing provider). These virtual machine instances are hosted on the computing device using a hypervisor (or other virtualization technology) and each virtual machine instance can contain a guest operating system, including a kernel, device drivers and other OS components. The host computing devices and other physical resources to host the virtual machines are usually provided by the service provider (or other operator of the environment) and reside in resource centers, such as a data centers, server farms, content delivery network (CDNs) points-of-presence (POPs) and the like. In order to control user access to the various virtual machines and other resources in the multitenant environment, the service provider can utilize credentials, where each user owns one or more of such credentials. Furthermore, the credential management system can be utilized to manage the credentials that may be suspected to be compromised or otherwise need to be rotated and/or disabled.

FIG. 1 illustrates an example 100 of a credential management system, in accordance with various embodiments. In various embodiments, the automated search component 102 may identify a set of credentials 103 that may be suspected to have been compromised or otherwise need to be rotated, renewed and/or disabled. As used herein, the term "credential" should be broadly construed and includes any security information that can be used to access one or more computing resources. Some examples of credentials include but are not limited to usernames, passwords, cryptographic keys, digital certificates and the like. The system can identify the set of credentials 103 by performing automated searches across common sources of credentials, or places where credentials may exist 101, such as public wiki pages, source code repositories and the like. Any location that may contain a credential may be searched by the automated search component 102. In alternative embodiments, the credentials may be provided as input by a user, such as an administrator of the system that has learned of the credentials in some other manner.

Once the credentials 103 have been identified, the credentials 103 can be checked for validity against one or more authorization systems 105. Invalid credentials can be ignored, while valid credentials are sorted by criticality based on what permissions are allowed by the credentials. For example, the credentials may be placed into multiple queues (e.g., highly critical, less critical, etc.) from which the credentials will be managed by the credential management system 104.

Once the potentially compromised credentials 103 have been identified, the owner of the credential may be notified. For example, upon entry into a queue, any identifiable users 110 (such as owners of the credential or users given access by those owners) can be contacted (e.g., via email, pager, etc.) with instructions to rotate the credential. They may be periodically reminded to rotate the credential at increasingly frequent intervals and increasing severity unless the credentials become no longer active. At a pre-set date, if the user 110 of the credential has not rotated it, the credential will start being disabled for short periods of time.

The credential management system 104 can identify the users using the credentials and the locations where the credential is being used. For example, beginning with the least frequent caller, the credential can be disabled specifically for that caller (e.g., via blocking of requests at the network level, corruption of requests as they pass over the network, or actually disabling them within an authorization service) for one unit of time, and then reinstated.

A separate service, such as monitoring service 107, monitors the availability graphs for every service that is on the network and that may be affected by the credential (e.g., is accessible by using the credential, depends on the credential in some way, etc.) and the system would look for changes (e.g., deltas) occurring during or after the credential was disabled. If a highly critical system experiences a significant drop in availability, the credential can be immediately reinstated and a notification can be generated for the affected systems. If no changes are noticed (or if availability remains at least above a specified threshold), then the credential can be disabled for a longer time interval. A confidence metric of the disabled credential causing the availability drop can then be determined by linking increased changes with increased time units of disabled credentials. This process of disabling the credential for increasingly longer time intervals can be repeated until it is stopped by human intervention (e.g., in the case of service owners being alerted that a cred disabling is affecting their service and that they must now be part of the drive to rotate the credential) or until the credential is disabled for a threshold time interval with no change in service availability. The threshold can be determined experimentally or can be specified by a user, such as an administrator of the system.

In various embodiments, the availability of the resources 106 may be determined by monitoring one or more availability graphs. The availability graphs may be based on information related to logs, metrics, syslog data, measurement characteristics of the operating system, network level authorization errors and any other information that is generated by the system and that is indicative of resource health. It is undesirable to cause the availability graphs of a resource to drop very significantly (e.g., disable resources) by disabling a credential. However, monitoring the dip in an availability graph can indicate what exactly the credential is used for even when such information is not known about the credential. Thus, the availability graphs can be used to identify what a credential affects. The system can collect information from logs (e.g., identities of computing resources for which access was denied) and look for correlation for one particular mode in time and look for spikes in logs or alerts. The system can correlate such spikes or alerts at a known time when the credential was disabled. In this manner, the system compares the metrics in the state of the credential enabled with the metrics in the state of the credential disabled in order to determine what the changes are.

In some embodiments, if a critical availability graph drops under a certain threshold then the system may immediately re-enable the credential. In some cases, the credential may be re-enabled in response to detecting such a drop even if the time interval for disabling the credential has not expired yet. This can be useful for maintaining a certain level of availability of resources 106 during the disabling of the credential.

In some embodiments, at the time of disabling the credential, the system may introduce a second version of the credential. Then the system can monitor if any changes are still present (e.g., dip in the availability graphs are still present). If the changes in availability are no longer present as a result of introducing the second version of the credential, the second version of the credential may be used to replace it permanently.

In some embodiments, the processes described herein can be used as a general way to expire credentials. Conventionally, once a credential expires, it is simply disabled. However, using the processes described herein, the system can determine when the credential expiration date is nearing, and begin to disable the credential for increasingly longer periods of time. In one embodiment, the system disables the credential, monitors the changes in availability of resources, then re-enables it. This process can be repeated several times, until the time of credential expiration is reached, as which point the credential is permanently disabled. This type of solution may avoid breaking the system by simply disabling the credential but rather would cause temporary periods of inaccessibility, notifications to be generated, and the like.

Figure 2:
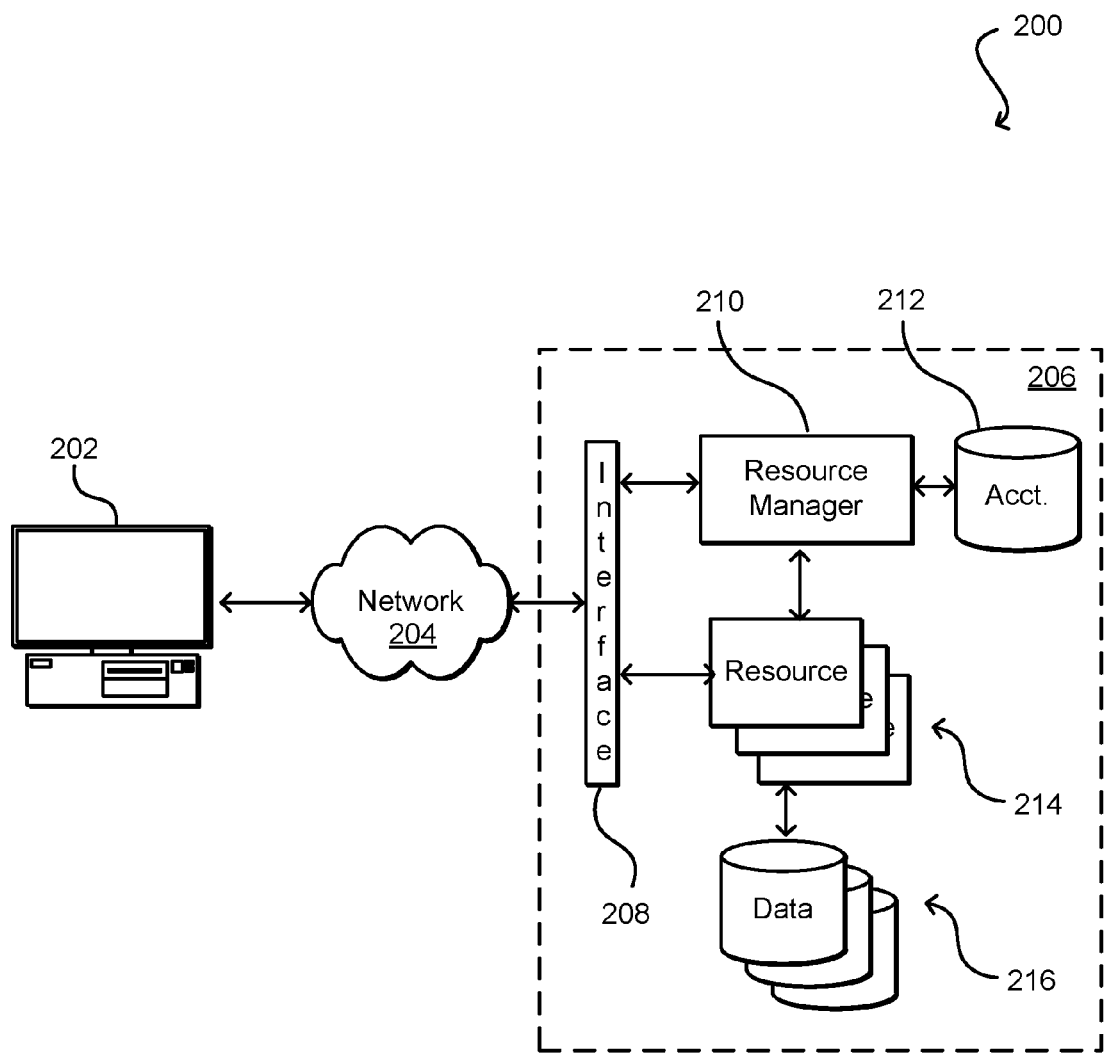
FIG. 2 illustrates an example of a multi-tenant virtualized computing environment in which aspects of the various embodiments can be implemented.

FIG. 2 illustrates an example multitenant environment 200 in which aspects of the various embodiments can be implemented. In this example a customer of a multi-tenant and/or shared resource virtualized computing environment 206 is able to utilize a client device 202 to submit requests across at least one network 204 to at least one designated address or interface of the environment 206. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 204 can include any appropriate network, including an intranet, the Internet, a cellular network, a local area network (LAN), or any other such network or combination, and communication over the network can be enabled via wired and/or wireless connections. The virtualized computing environment 206 can be supported and/or offered by a resource provider, and can include any appropriate components for receiving requests and returning information or performing actions in response to those requests. As an example, the environment might include Web servers and/or application servers for receiving and processing requests, then returning data, Web pages, video, audio, or other such content or information in response to the request. In many cases, the customer will have an account with the provider of the virtualized computing environment that indicates which resources or types of resources the customer can access, an amount of that access, types of tasks that can be performed with that access, or other such terms. One or more users might be associated with the customer, and thus can be able to access the resources per the customer account.

In various embodiments, the environment 206 may include various types of resources that can be utilized by multiple users for a variety of different purposes. In at least some embodiments, all or a portion of a given resource or set of resources might be allocated to a particular customer or allocated for a particular task, for at least a determined period of time. The sharing of these resources from a multi-tenant virtualized computing environment is often referred to as resource sharing, Web services, or "cloud computing," among other such terms and depending upon the specific environment and/or implementation. In this example the multi-tenant virtualized computing environment includes a plurality of resources 214 of one or more types. These types can include, for example, application servers operable to process instructions provided by a user or database servers operable to process data stored in one or more data stores 216 in response to a user request. As known for such purposes, the customer can also reserve at least a portion of the data storage in a given data store. Methods for enabling a customer to reserve various resources and resource instances are well known in the art, such that detailed description of the entire process, and explanation of all possible components, will not be discussed in detail herein.

In at least some embodiments, a user wanting to utilize at least a portion of the resources 214 can submit a request that is received to an interface layer 208 of the multi-tenant virtualized computing environment 206. The interface layer can include application programming interfaces (APIs) or other exposed interfaces enabling a user to submit requests to the multi-tenant virtualized computing environment, as well as to perform other tasks such as configuring one or more resources or rotating a credential for the user, etc. The interface layer 208 in this example can also include other components as well, such as at least one Web server, routing components, load balancers, and the like. When a request to provision a resource is received to the interface layer 208, for example, information for the request can be directed to a resource manager 210 or other such system, service, or component configured to manage user accounts and information, resource provisioning and usage, and other such aspects. A resource manager 210 receiving the request can perform tasks such as to authenticate an identity of the user submitting the request, as well as to determine whether that user has an existing account, or is associated with a customer having an existing account, with the resource provider, where the account data may be stored in at least one data store 212 in the environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user is not associated with a valid account with the provider, an associated account does not enable access to the type of resources specified in the request, or another such reason is preventing the user from obtaining access to such resources, a communication can be sent to the user (or associated customer) to enable the user to create or modify an account, or change the resources specified in the request, among other such options.

Once the user and/or request is authenticated, the account verified, and the resources allocated, the user can utilize the allocated resource(s) for the specified capacity, amount of data transfer, period of time, or other such metric. In at least some embodiments, a user might provide a session token or other such credentials with subsequent requests in order to enable those requests to be processed based on that user session. The user can receive a resource identifier, specific address, or other such information that can enable the client device 202 to communicate with an allocated resource without having to communicate with the resource manager 210, at least until such time as a relevant aspect of the user account changes, the user is no longer granted access to the resource, or another such aspect changes.

The resource manager 210 (or another such system or service) in this example can also function as a virtual layer of hardware and software components that handles control functions in addition to management actions, as may include provisioning, scaling, replication, etc. The resource manager can utilize dedicated APIs in the interface layer 208, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 208 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 3:
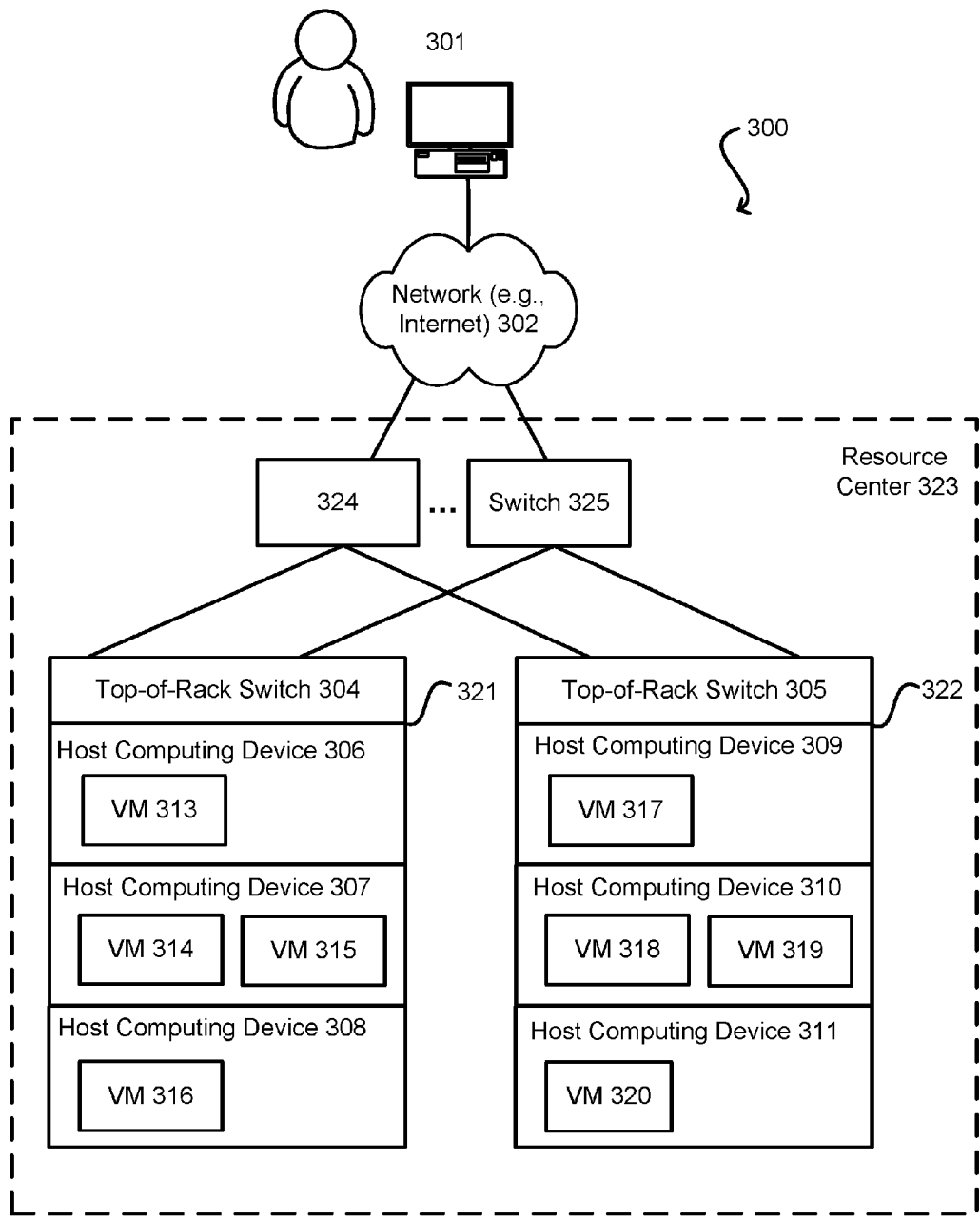
FIG. 3 illustrates an example of a resource center environment in which the multitenant environment may be implemented, in accordance with various embodiments.

FIG. 3 illustrates an example 300 of a resource center environment in which the multitenant environment may be implemented, in accordance with various embodiments. In the illustrated embodiment, a service provider (e.g., a cloud computing resource provider) can maintain one or more resource centers 323 (e.g., data centers, server farms, etc.) that store the physical resources (e.g., host computing devices, etc.) of the service provider. These physical resources can be used to host a number of virtual machine instances or virtual servers that can be provided to users 301 over a network 302, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual private networks (VPNs) and the like. Access to all of these resources provisioned for the user (e.g., customer) may be controlled by using one or more security policies specified by the user, as previously described.

In the illustrated example, the resource center 323 of the service provider may include one or more racks 321, 322 of host computing devices (306, 307, 308, 309, 310) wherein each host computing device on a particular rack is connected to a single top-of-rack (TOR) switch (304, 305). These TOR switches can be further connected to one or more other switches (324, 325) which enable the host computing devices to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host computing device can host one or more virtual machine instances (313, 314, 315, 316, 317, 318, 319, 320) that have been provisioned for the customers of the service provider to execute the various applications and services on behalf of those customers. Each virtual machine can be provisioned with its own operating system (OS) including a kernel, drivers, process management and the like.

When a customer wishes to obtain a virtual machine instance, the customer can first submit a request to the service provider, indicating the type of VM they would like to use. As part of the request, the user may submit one or more credentials (e.g., username, password, etc.). If the user is authenticated, the service provider may carry out the processes to provision the virtual machine instance which will be hosted on the physical resources (e.g., host computing devices) of the service provider. The virtual machine instance can then be used to execute the various applications and services on behalf of the customer, utilizing the resources of the service provider. The user may also utilize credentials to access, modify or otherwise control the virtual machines running in the multitenant environment. In this environment, the credentials, such as potentially compromised credentials, can be managed for each host computing device and virtual machine by using a credential management system, as previously described.

Figure 4:
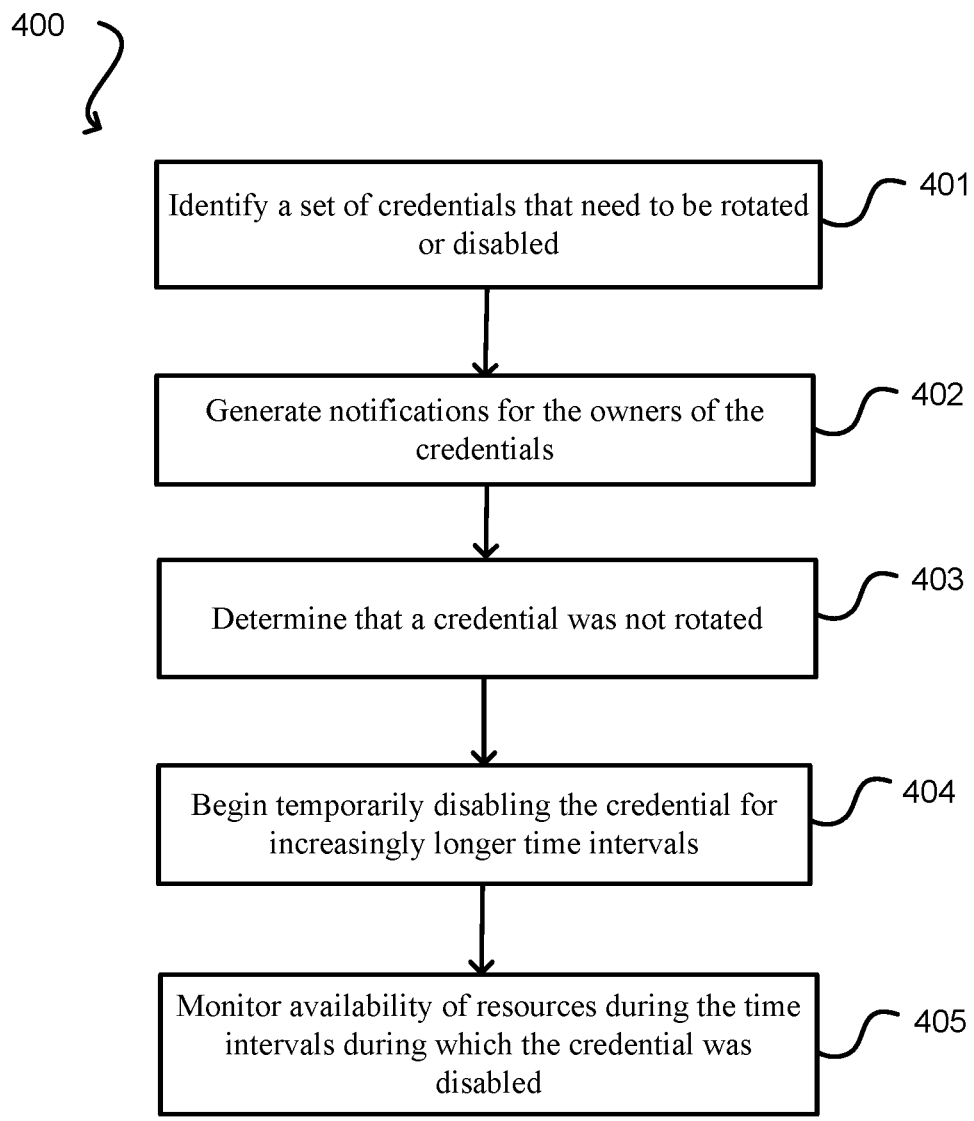
FIG. 4 illustrates an example process for identifying a set of credentials that should be rotated, in accordance with various embodiments.

FIG. 4 illustrates an example process 400 for identifying a set of credentials that should be rotated, in accordance with various embodiments. Although this figure as well as other process flows contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 401, the system identifies a set of credentials that may be suspected to have been compromised or otherwise need to be rotated. The credentials are capable of being used to authenticate an owner of the credential against one or more authentication systems. The credentials can also be used to enable users, having been given access to the credential by the owner, to be authenticated as well in various embodiments.

In operation 402, the system generates notifications to the owners of the credentials. For example, the owners may be notified by email, text message or by any other methods known in the art. The notification can instruct the owner to rotate the credential and the notifications may be periodically re-sent to remind the owner of the credential. If after some time (e.g., a specified maximum allowed time to disable the credential), the system determines that the owner has not rotated the credential (operation 403), the system may begin to temporarily disable the credential (operation 404). While the system is temporarily disabling the credential, the system may monitor the availability of the resources that are accessible by using the credential, as shown in operation 405. For example, the system may monitor the system generated logs and other metrics to determine the availability of the resources.

Figure 5:
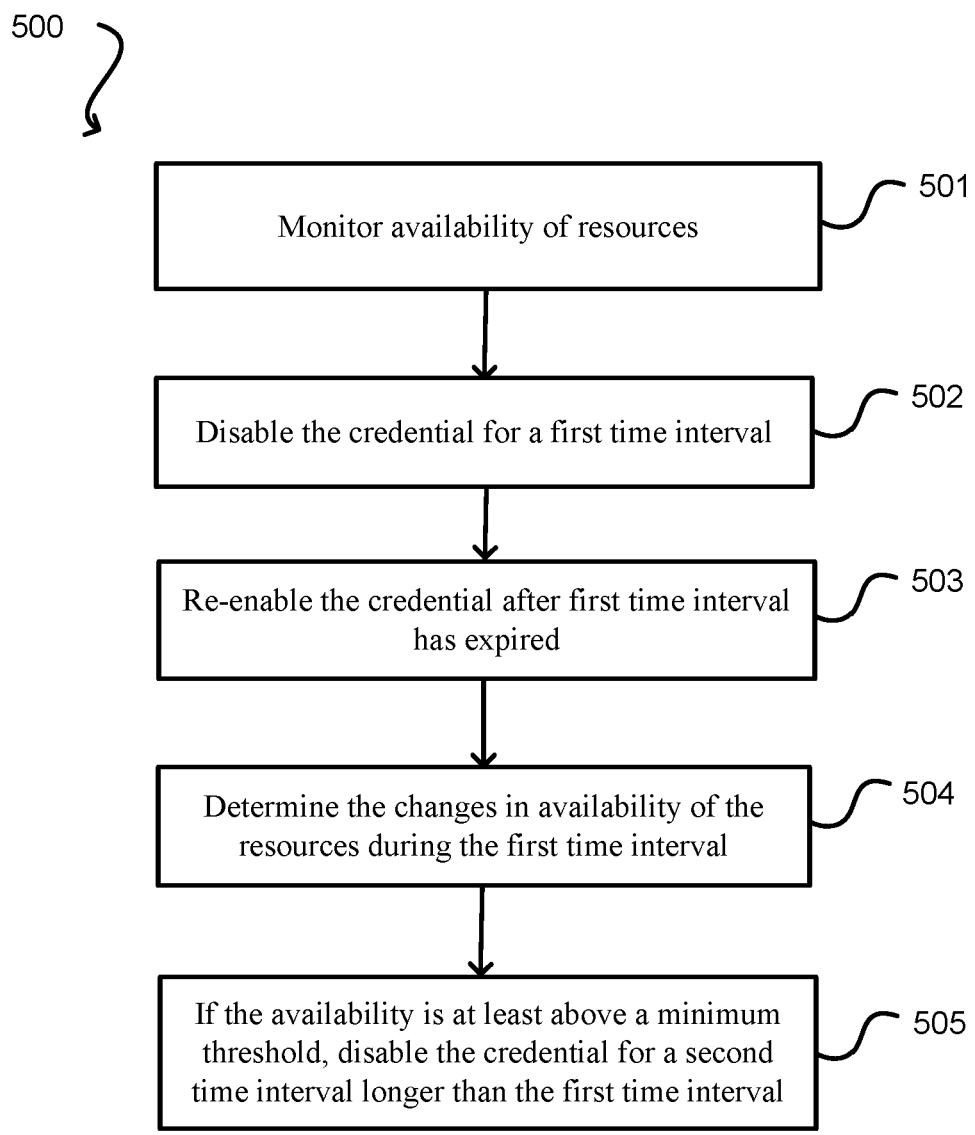
FIG. 5 illustrates an example of disabling the credential for an increasingly longer time interval, in accordance with various embodiments.

FIG. 5 illustrates an example 500 of disabling the credential for an increasingly longer time interval, in accordance with various embodiments. As shown in operation 501, the system may monitor the availability of resources (e.g., resource availability graphs), as previously described. In operation 502, the system disables the credential for a first time interval. The credential can be disabled via blocking of requests at the network level, corruption of requests as they pass over the network, or actually disabling them within an authorization service. In one embodiment, the first time interval is a relatively short time interval (e.g., seconds, milliseconds, etc.). After the first time interval expires, the system re-enables the credential, as shown in operation 503.

In operation 504, the system determines a change (delta) in the availability of the resources that are accessible by the credential. For example, the system may inspect the availability graphs of the resources at the time interval during which the credential was disabled. If the availability of the resources has remained at least above a minimum threshold during the time interval, the system can disable the credential for a second time interval that is longer than the first time interval, as shown in operation 505. This process can continue until it is ended by a user (e.g., administrator) or until the time interval for disabling the credential has reached a specified duration and the availability of the resources remains sufficiently uninterrupted. At this point, the credential can be rotated or permanently disabled.

Figure 6:
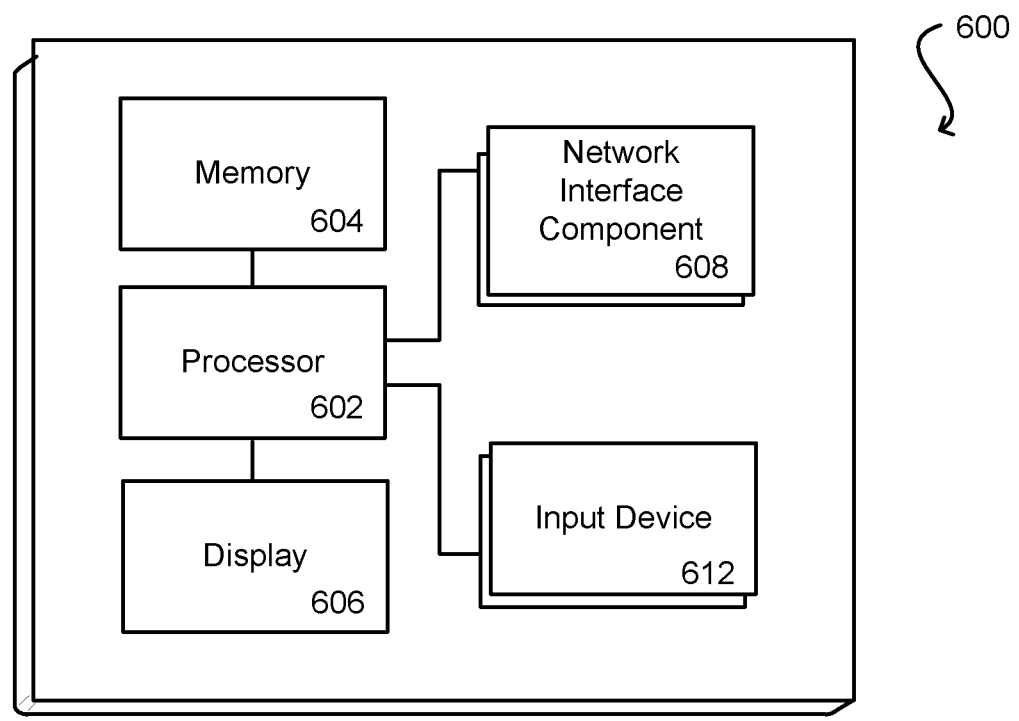
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 612 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
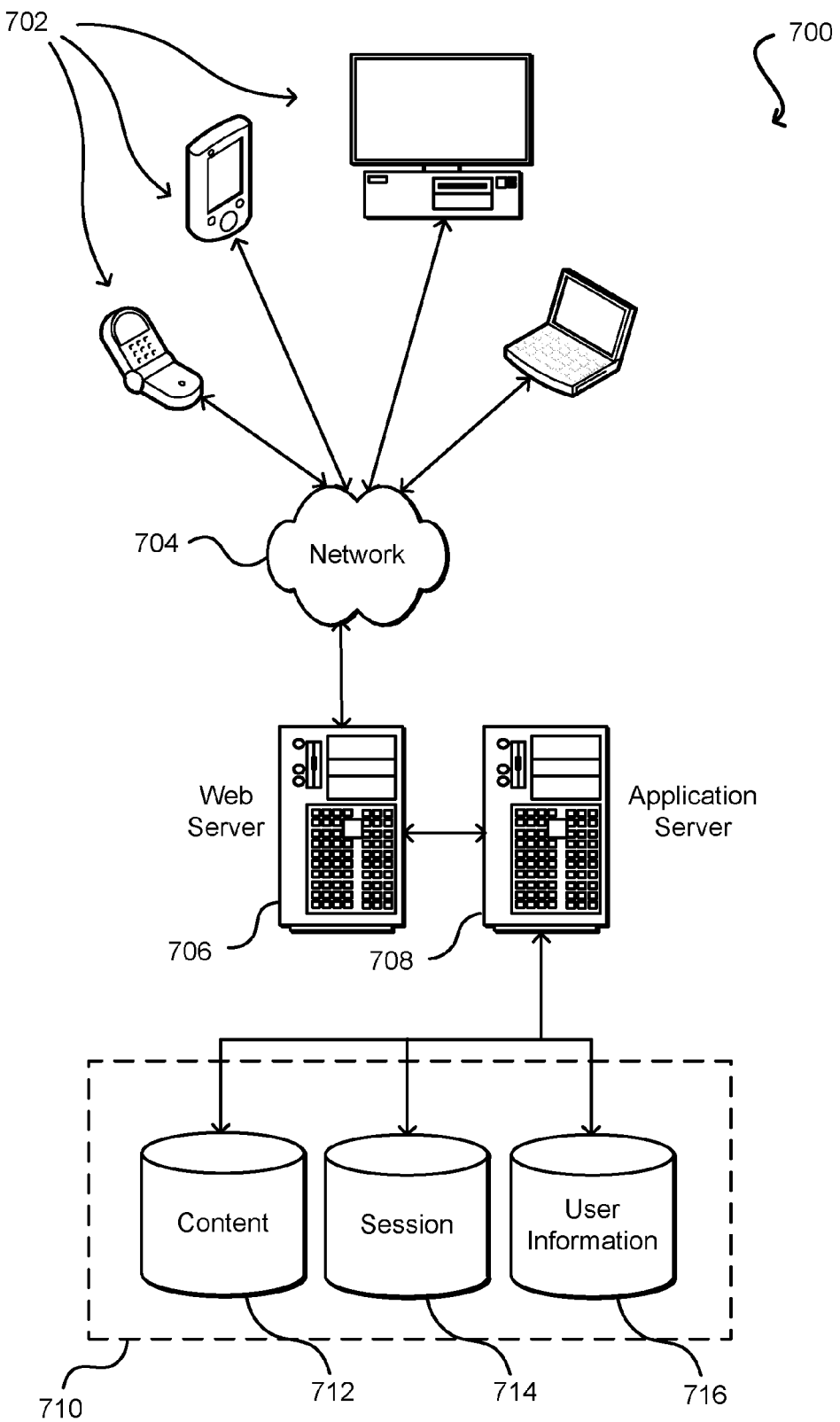
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
   at a credential management system including at least one processor and memory, the memory communicatively coupled to the at least one processor and storing instructions, the at least one processor executing the instructions to perform the operations of:
   identifying a credential in a set of credentials corresponding to a user, the user authenticated to access a first computing resource based at least in part on the credential, wherein the credential is identified as suspect or identified as being in need of at least one of rotation, renewal, or permanent disablement;
   after identifying the credential, disabling the credential for a first period of time;
   monitoring an availability of a plurality of second computing resources for the first period of time while the credential is disabled; and
   determining, by the at least one processor of the credential management system, whether to re-enable, renew, rotate, or permanently disable the credential based at least in part on the availability of the second computing resources and an availability threshold associated with the second computing resources.

2. The computer implemented method of claim 1, further comprising re-enabling the credential based at least in part on the availability of at least one of the second computing resources decreasing below the associated availability threshold during a first time interval.

3. The computer-implemented method of claim 2, further comprising disabling the credential based at least in part on the availability of the at least one second computing resource remaining above at least the associated availability threshold during a second time interval, the second time interval being longer than the first time interval.

4. The computer-implemented method of claim 3, further comprising re-enabling the credential based at least in part on the availability of the at least one second computing resource remaining unchanged for at least one of the first time interval or the second time interval.

5. The computer implemented method of claim 3, further comprising:
   disabling the credential for a second amount of time based at least in part upon the availability of the at least one second computing resource remaining above at least the associated availability threshold during both the first time interval and the second time interval, the second amount of time longer than the first amount of time, first time interval, or the second time interval.

6. The computer implemented method of claim 1, wherein identifying the credential further comprises:
   arranging the set of credentials based on permissions associated with each credential; and
   selecting the credential based on the permissions.

7. The computer implemented method of claim 1, further comprising:
   generating a second version of the credential to replace the credential based at least in part on the monitoring of the availability of one or more of the plurality of second computing resources.

8. A computing system, comprising:
   at least one processor; and
   memory including instructions that, when executed by the at least one processor, cause the computing system to:
   monitor an availability of one or more computing resources accessible using a credential of a set of credentials corresponding to a user, the credential having an expiration time period and capable of being used to authenticate against one or more authentication systems to access the one or more first computing resources, wherein the credential is identified as suspect or identified as being in need of at least one of rotation, renewal, or permanent disablement;
   disable the credential for a first time interval, the first time interval shorter than the expiration time period;
   determine that the availability of one or more second computing resources related to the credential remain at least at a minimum threshold while the credential is disabled; and
   disable the credential until a change in the availability of one or more second computing resources is detected.

9. The computing system of claim 8, wherein the instructions when executed further cause the computer system to:
   re-enable the credential in response to at least one of detecting a change in the availability of the one or more second computing resources or an expiration of a second time interval.

10. The computing system of claim 9, wherein the instructions when executed further cause the computer system to:
    determine that the availability of the one or more second computing resources remained at least at the minimum threshold during the second time interval during which use of the credential was disabled;
    disable the credential for a third time interval that is longer than the second time interval;
    determine that the availability of the one or more second computing resources remained at least at the minimum threshold during at least the second time interval and the third time interval; and
    permanently disable the credential.

11. The computing system of claim 8, wherein the instructions when executed further cause the computer system to:
    detect that the availability of a critical second resource has decreased below the minimum threshold; and
    re-enable the credential in response to detecting that the availability of the critical second resource has decreased.

12. The computing system of claim 8, wherein the credential is disabled for a third time interval longer than the first time interval as the expiration time of the credential approaches.

13. The computing system of claim 8, wherein the instructions when executed further cause the computer system to:
 re-enable the credential in response to detecting a disruption in the availability of the one or more second computing resources prior to the end of the first time interval.

14. The computing system of claim 8, wherein disabling the credential includes:
 determining a confidence metric of the credential based at least in part on the availability of the one or more second computing resources.

15. A non-transitory computer-readable storage medium storing instructions that, when executed by at least one processor of a computing system, causes the computer system to:
 select a credential of a set of credentials corresponding to a first user, the credential capable of being used to authenticate against one or more authentication systems to access one or more first computing resources, the credential being identified as suspect or identified as being in need of at least one of rotation, renewal, or permanent disablement;
 disable the credential for a time interval;
 monitor an availability of one or more second computing resources related to the credential;
 maintain the credential as disabled if the availability of the one or more second computing resources remains above at least a minimum threshold during the time interval; and
 maintain the credential as disabled until a change in the availability of the one or more second computing resources.

16. The non-transitory computer-readable storage medium of claim 15, wherein the instructions to monitor the availability of the one or more computing resources when executed further cause the computing system to:
 determine an availability of the one or more second computing resources based at least in part on information contained in one or more logs.

17. The non-transitory computer-readable storage medium of claim 15, wherein the instructions when executed further cause the computing system to:
 detect that the availability of a critical second resource, of the one or more second computing resources, has decreased below the minimum threshold; and
 re-enable the credential in response to detecting that the availability of the critical second resource has decreased.

18. The non-transitory computer-readable storage medium of claim 15, wherein the instructions to select the credential when executed further cause the computing system to:
 identify, by executing automated searches across one or more specified locations, a plurality of credentials that are likely to have been compromised.

19. The non-transitory computer-readable storage medium of claim 15, wherein the one or more first computing resources include at least resource capable of being shared among a plurality of users of a multi-tenant environment.

20. The non-transitory computer-readable storage medium of claim 15, further comprising:
 at least one programmable application programming interface (API) capable of receiving requests from one or more users of the one or more resource including the first user, the API enabling the one or more users to perform one or more tasks including at least one of: accessing the one or more first resources or configuring at least a subset of the one or more first resources.

\* \* \* \* \*